United States Patent [19]  [11] Patent Number: 4,669,200
Carr  [45] Date of Patent: Jun. 2, 1987

[54] BULKHEAD SEAL FOR CLOTHES DRYER

[75] Inventor: Keith E. Carr, Lincoln Township, Berrien County, Mich.

[73] Assignee: Whirlpool Corporation, Benton Harbor, Mich.

[21] Appl. No.: 802,247

[22] Filed: Nov. 27, 1985

[51] Int. Cl.⁴ .............................................. F26B 25/08
[52] U.S. Cl. ........................................ 34/242; 34/133; 432/242; 277/152; 277/229
[58] Field of Search ................. 34/242, 133; 432/242; 277/152, 157, 235, 227, 229

[56] References Cited

U.S. PATENT DOCUMENTS 3,039,285  6/1962  Smith .
3,471,940 10/1969  Smith .
3,637,224  1/1972  Triplett et al. .
3,828,445  8/1974  Smoot .
4,007,546  2/1977  Sauer .................................... 34/242
4,207,686  6/1980  Daily .

Primary Examiner—Larry I. Schwartz
Attorney, Agent, or Firm—Hill, Van Santen, Steadman & Simpson

[57] ABSTRACT

A seal for use in clothes dryers and the like having a carrier web and a fibrous sealing web, wherein the fibrous sealing web has opposite edges thereof folded upon itself and stitched to form first and second loops and a first one of the loops has captured therein an edge of the carrier web. The carrier web is secured to a rotating drum of a clothes dryer and the first and second loops of the fibrous sealing web provide first and second seals at respective planar and cylindrical portions of a stationary bulkhead of the dryer.

8 Claims, 7 Drawing Figures

U.S. Patent  Jun. 2, 1987  4,669,200
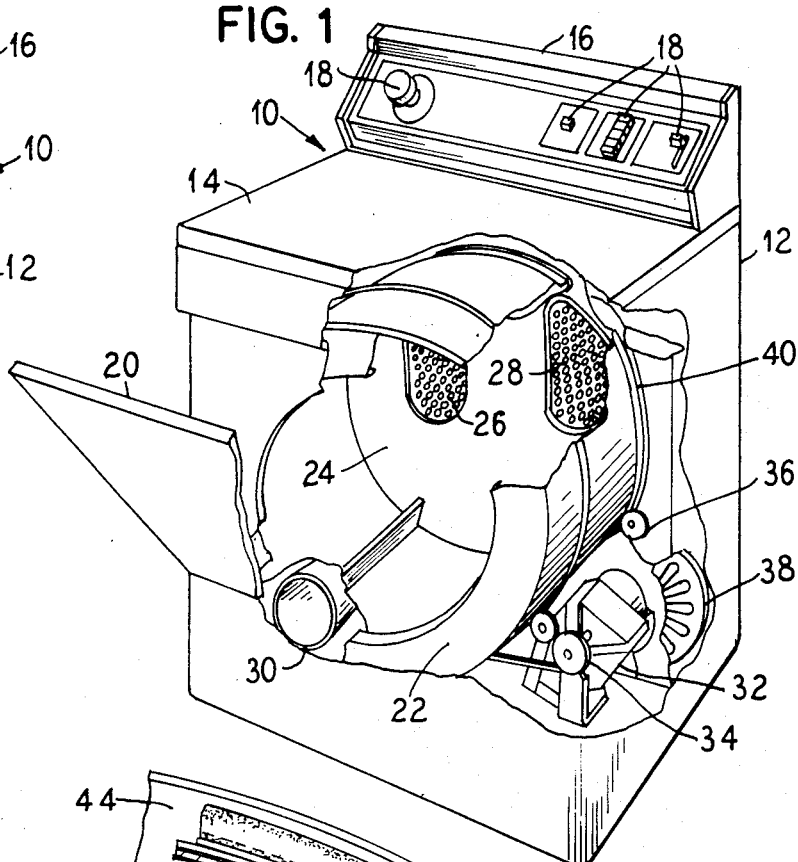
FIG. 1
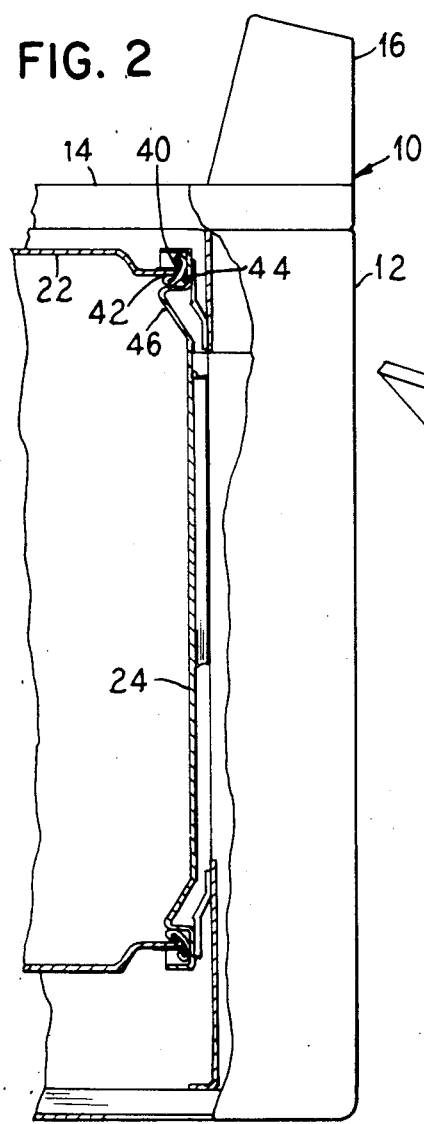
FIG. 2
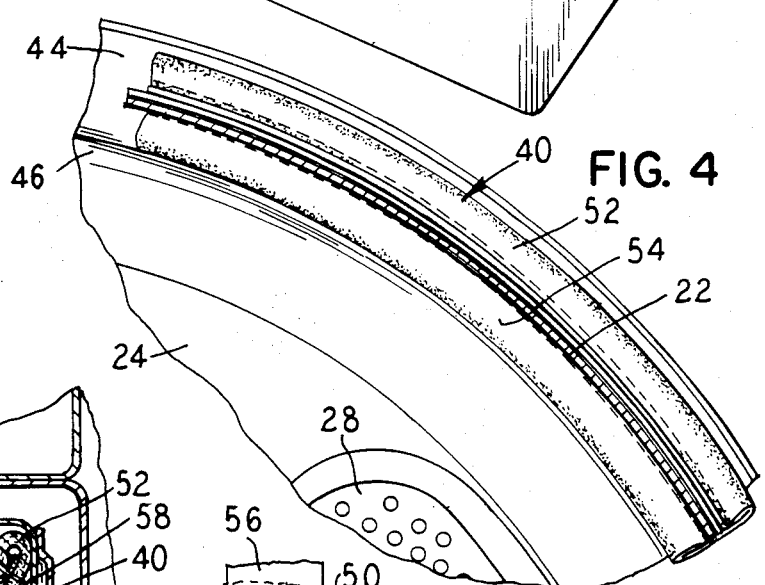
FIG. 4
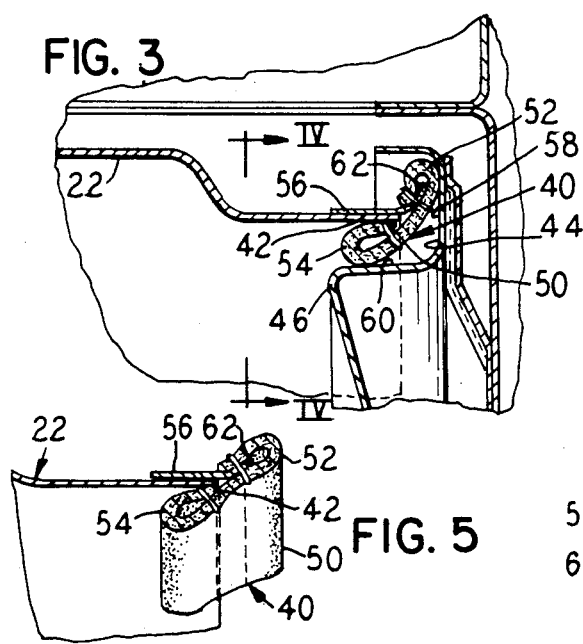
FIG. 3
FIG. 5
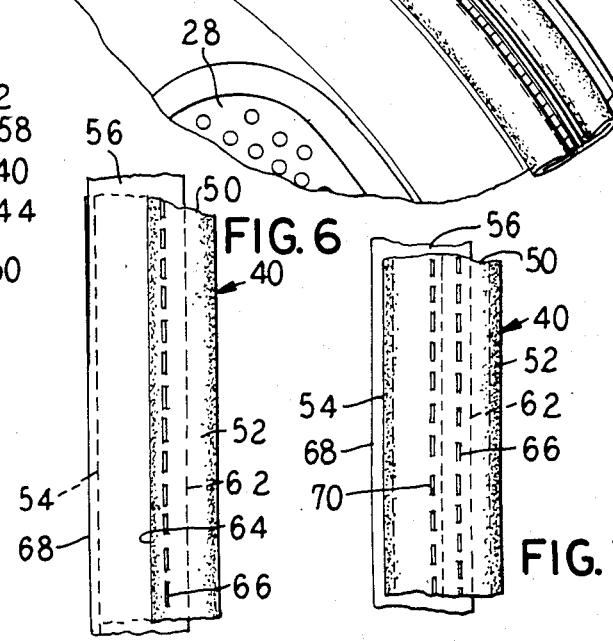
FIG. 6
FIG. 7

BULKHEAD SEAL FOR CLOTHES DRYER

BACKGROUND OF THE INVENTION

1. Field of the Invention

The present invention relates generally to a seal provided between a dryer drum and a bulkhead portion of a clothes dryer.

2. Description of the Prior Art

It is known to provide a felt seal between a rotating dryer drum and a stationary bulkhead in a clothes dryer. For instance, Triplett et al U.S. Pat. No. 3,637,224 discloses an annular sealing ring of polyester felt having a silicon rubber elastomeric backing which is folded upon itself with the edges stitched together to form a teardrop shape. The folded seal is secured to a flange on a stationary duct plate and engages an annular depression in a rotatable clothes basket. Only a single seal is formed by the Triplett device.

In Smoot U.S. Pat. No. 3,875,686 a resin support strip supports a wear strip of felt. In FIG. 3, the T-shaped seal member is stapled to a drum and the wear strip includes a longitudinal loop at its mid-region that is disposed between the bulkhead and the drum.

Smith U.S. Pat. No. 3,816,942 discloses a bulkhead seal for clothes dryers wherein a U-shaped felt member is fixed to a stationary bulkhead by an adhesive at one leg thereof; an opposite leg thereof engages an annular recess of a rotatable tumbler. The felt strip is coated with an anti-friction layer such as polytetrafluoroethylene.

Cobb et al U.S. Pat. No. 3,409,997 discloses a "Naugahyde" seal having a U-shaped loop with oppositely extending legs secured by a metal band to a rotatable drum to engage a recess in a stationary bulkhead.

SUMMARY OF THE INVENTION

It is an object of the present invention to provide a simple and inexpensive bulkhead seal which, during installation, automatically positions itself to form a seal on each of a planar and cylindrical surface.

This and other objects are achieved in a seal for use in a clothes dryer between a rotating drum and a stationary bulkhead that includes a carrier web affixed to an edge of the dryer drum and a sealing web folded upon itself to form upper and lower loops. The upper loop engages a planar portion of the bulkhead and the lower loop engages a cylindrical portion of the bulkhead so that two separate seals are formed.

The shape of the present seal enables the dryer drum to which it is affixed to be easily installed into the dryer without the seal becoming dislodged from the drum or becoming improperly folded. Proper alignment of the seal is thus ensured during installation.

The present seal is made by folding opposing edges of an elongated web of sealing material toward one side of the web and stitching a first one of the folded edges longitudinally to form a first loop. One edge of an elongated web of a carrier material is captured in the second folded edge, and a second row of stitching parallel with the first secures the carrier therein and forms a second loop. The completed seal assembly is thereafter ready for application to a dryer drum.

BRIEF DESCRIPTION OF THE DRAWINGS

FIG. 1 is a perspective view of a clothes dryer including the seal of the present invention.

FIG. 2 is a fragmentary side elevational view of the dryer of FIG. 1 shown partially in cross-section.

FIG. 3 is an enlarged cross-section of a portion of FIG. 2.

FIG. 4 is a cross-section of the device of FIG. 3 taken along lines IV—IV.

FIG. 5 is a cross-section of a seal according to the present invention mounted on a dryer drum prior to assembly of the dryer.

FIG. 6 is a fragmentary elevational view of a front surface of the seal according to the present invention.

FIG. 7 is a fragmentary elevational view of a rear surface of the seal of FIG. 6.

DESCRIPTION OF THE PREFERRED EMBODIMENTS

In FIG. 1, there is generally shown an automatic clothes dryer 10 having a cabinet 12 with a top panel 14 having a control console 16 along a rear portion thereof incorporating a plurality of controls 18 for selecting an automatic series of drying steps. The dryer cabinet 12 has a front openable door 20 providing access to the interior of a horizontally rotatable drying drum 22. The drum 22 has a non-rotating rear bulkhead 24 with air inlets 26 and air outlets 28 therein for charging the interior of the drum 22 with heated air from a heater 30 and for exhausting moisture ladden air. An electric motor 32 is provided to rotate the drum 22 through a pulley arrangement 34 on a plurality of rollers 36. The motor 32 also drives a fan 38 which provides the air flow through the interior of the drum 22.

As shown in FIG. 2, the rotating drum 22 and the stationary bulkhead 24 include a seal 40 extending therebetween. The seal 40 is affixed to a rim 42 of the rotatable drum 22 and is in frictional engagement with two surfaces of a channel 44 on the stationary bulkhead 24 to provide a dual air seal between the bulkhead 24 and the drum 22; thus preventing the exchange of heated air within the drying compartment with cool outside air. The channel 44 is formed, in part, by an annular embossment 46 on the bulkhead 24 which is radially inward of the channel 44 to deflect clothing away from the seal 40.

As can be seen more clearly in FIG. 3, the seal 40 includes a sealing web 50 having first and second loops 52 and 54 and a carrier 56. The carrier 56 is attached to the rim 42 of the drum 22, such as by adhesive. A first, planar seal is established by the first loop 52 contacting a planar wall 58 of the channel 44. A second, cylindrical seal is established by the second loop 54 contacting a cylindrical wall 60 of the channel 44 formed by the bulkhead embossment 46. Together, the planar seal and the cylindrical seal provide an effective air seal to retain heated air within the dryer drum 22 and prevent cool air from entering. The seal also prevents clothing and other articles within the dryer drum 22 from being caught between the rim 42 of the rotating drum and the bulkhead channel 44.

In FIG. 4, the seal 40 can be seen extending both interiorly and exteriorly of the drum 22. The first loop 52 is exterior of the drum 22 while the second loop 54 is interior of the drum 22. The seal 40 extends around the entire annular rim 42 of the drum 22 to provide a dual seal between the drum 22 and the bulkhead 24. Opposite ends of the strip-shaped seal 40, when secured on the drum 22, abut one another (not shown) and may be affixed theretogether by stitching.

In FIG. 5, the seal 40 is shown mounted on the drum 22 prior to assembly of the drum 22 within the dryer 10. The carrier web 56 has been stretched over the rim 42 of the drum 22 and the first loop 52 extends upwardly and outwardly therefrom, while the second loop 54 extends downwardly and inwardly therefrom. The first and second loops 52 and 54 are generally in-line with respect to one another and describe a first angle with respect to the drum 22 which, taken as a whole defines a conical annular ring extending both inwardly and outwardly from the rim 42. The rim 42 may also be flared outward to further enhance the angular aspect of the loops 52 and 54.

As the drum 22 is placed into the dryer 10 and the rim 42 is placed over the bulkhead embossment 46, the seal 40 deforms to the shape shown in FIG. 3. The seal 40 now describes a second, different angle with respect to the drum. Furthermore, the loops 52 and 54 no longer are in-line but are angled with respect to one another. The angular movement, or camming, assures the proper alignment of the seal 40 and the integrity of both the planar and cylindrical seals. The seal 40 also provides a stop between the drum 22 and the bulkhead 24 during installation.

In a preferred embodiment, the carrier 56 is of a stretchable, resilient plastic material, such as vinyl coated fabric. Its length is preferably slightly smaller than the diameter of a rim 42 of the drum 22 to which it is secured. The carrier 52 is applied by stretching and gluing to the rim 42 to form a sealing ring.

The sealing web 50 is preferably a felt, synthetic backing or synthetic fiber mat, and in one embodiment is heavy wool-polyester felt of approximately 12 ounces per square yard. Heavy felt has sufficient body to retain its shape and ensure excellent all around performance.

FIGS. 6 and 7 depict the front and back surfaces of the seal 40 to more clearly show the relationship between the carrier 56 and the sealing web 50. In FIG. 6, a first edge 62 of the carrier 56 extends under an edge 64 of the sealing web 50 which forms the first loop 52. A row of stitching 66 extends longitudinally spaced from the edge 64 to affix the carrier 44 to the sealing web 50 and also form the first loop 52.

In FIG. 7, an opposing side of the seal 40 can be seen. A second, opposite edge 68 of the carrier 56 extends slightly beyond the second loop 54. A second row of stitching 70 holds an opposing edge (not shown) which forms the second loop 54 and extends parallel to and spaced from the stitching 66. The arrangement of the stitching 66 and 70 is significant to the proper functioning of the seal 40.

The present invention thus provides an effective air seal between a rotating drum 22 and a stationary bulkhead 29 of a clothes dryer 10; in particular, a seal is provided both on a cylindrical surface 60 and on a planar surface 58 of the stationary bulkhead. The present seal 40 enables the drum 22 to be installed within the dryer 10 with little chance of improper orientation or dislodging of the seal 40. The present device also enables the drum 22 to move relative to the bulkhead 24, and especially axial movement, while still maintaining an effective air seal therebetween.

The felt or fiber mat material 50 both restricts the passage of air therethrough and provides a low friction bearing surface which slidably interacts with the stationary bulkhead 24. The present seal 40 is easily installed in a dryer 10 and is easily fabricated of commonly available materials, namely vinyl coated fabric and felt, simply by folding and stitching.

It is apparent from the foregoing specification, that the invention is susceptible to being embodied with various alterations and modifications which may differ particularly from those that I have described in the preceding specification and description. It should be understood that I wish to embody within the scope of the patent granted hereon all such modifications as reasonably and properly come within the scope of my contribution to the art.

The embodiments of the invention in which an exclusive property or privilege is claimed are defined as follows:

1. A sealing member for use in a fabric drying apparatus having first and second bodies being movable with respect to one another, said first body having adjacent first and second angularly related surfaces, said sealing member comprising:
   an elongated carrier web having first and second opposed edges, said carrier being affixed along said first edge to said second body;
   an elongated sealing web having first and second opposed edges and a longitudinal mid-portion extending therebetween, said sealing web being affixed generally at said mid-portion to said carrier web and said first and second sealing web edges being folded back toward said longitudinal mid-portion to form respective first and second loops, said first and second loops engaging said respective first and second angularly related surfaces of said first body;
   first securing means affixing said folded back first sealing web edge to said longitudinal mid-portion; and
   second securing means affixing said folded back second sealing web edge to said longitudinal mid-portion.

2. A sealing member as claimed in claim 1 wherein said sealing web is of felt.

3. A sealing member as claimed in claim 1 wherein said carrier web is of stretchable plastic.

4. A sealing member as claimed in claim 1 wherein said carrier web is of vinyl coated fabric.

5. A sealing member as claimed in claim 1 wherein said first and second securing means includes respective parallel rows of stitching.

6. A sealing member for use in a dryer having a rotatable drum and a stationary bulkhead having planar and cylindrical portions, comprising:
   a carrier web affixed to a rim of said rotatable drum;
   sealing web secured to said carrier web, said sealing web having first and second opposite edges folded to form first and second loops;
   means for affixing said first and second folded edges of said sealing web in folded position; and
   said first loop extending between said drum and said planar portion of said bulkhead to form a first seal and said second loop extending between said drum and said cylindrical portion of said bulkhead to form a second seal, said first loop extending exteriorly of said drum and said second loop extending interiorly of said drum.

7. A sealing member for use in a dryer having a rotatable drum with a flared rim, and a stationary bulkhead with a cylindrical surface and a planar surface, comprising:

an elongated resilient carrier web having first and second opposed edges, said first carrier web edge being affixed to said flared rim of said rotatable drum;

an elongated fibrous sealing web having first and second opposed edges and a longitudinal mid-portion extending therebetween, said first and second opposed edges being folded longitudinally over a first surface of said mid-portion to form respective first and second loops, said second carrier web edge being captured in said first loop;

first and second parallel rows of stitching securing respective ones of said first and second sealing web edges to said mid-portion, said first row of stitching securing said second carrier web edge within said first loop;

said first and second loops defining a first angular relationship to said flared rim prior to installation of said drum within said dryer, said first and second loops defining a second angular relationship to said flared rim subsequent to installation of said drum within said dryer wherein said first loop engages said planar bulkhead surface and said second loop engages said cylindrical bulkhead surface 8. For use in a dryer having a rotatable drum and a stationary bulkhead thereby providing a circumferentially extending cylindrical surface disposed outwardly of the drum axis and a radially extending wall intersecting said cylindrical surface providing a planar surface:

a sealing member made of a fibrous sheet-form webbing material folded upon itself from opposite edges to overlie a central body portion;

stitching passing through each respective edge and the adjoining central body portion thereby to form a pair of spaced loops;

a carrier web connected to one of said loops and adapted to be connected to and adjoining surface of the rotating drum; and sealing surfaces on the outside of said loops for engaging said cylindrical and planar surfaces.

* * * * *